Oct. 26, 1943. W. C. EDDY 2,332,785
REMOTE CONTROL APPARATUS
Filed May 26, 1939 3 Sheets-Sheet 1
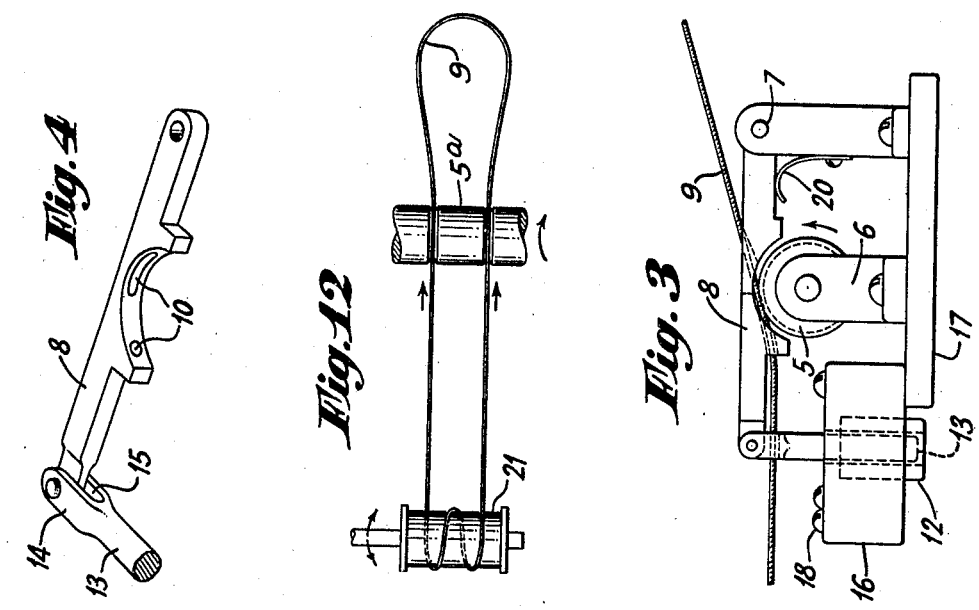
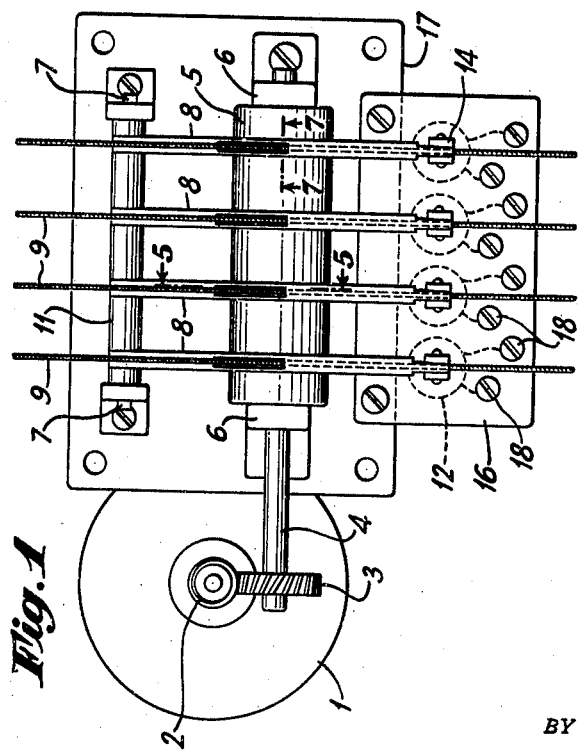
INVENTOR.
WILLIAM C. EDDY
BY
H. S. Snover
ATTORNEY.

Oct. 26, 1943.    W. C. EDDY    2,332,785
REMOTE CONTROL APPARATUS
Filed May 26, 1939    3 Sheets-Sheet 2
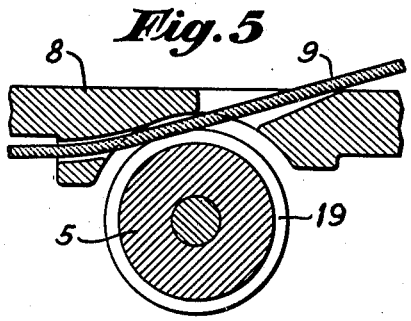
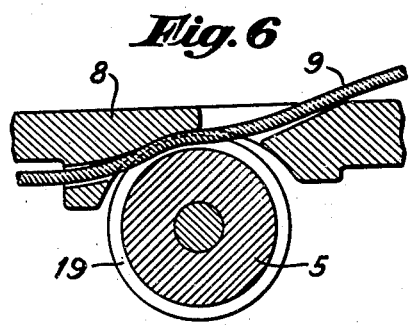
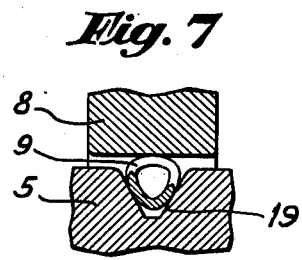
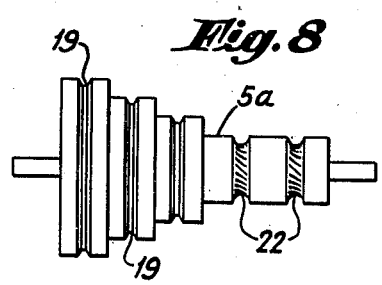
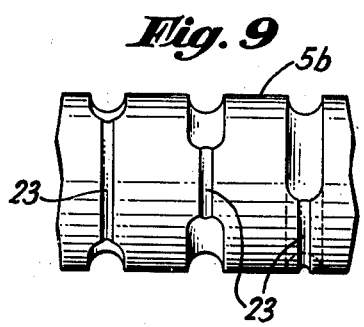
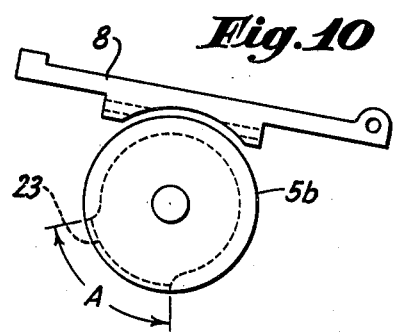
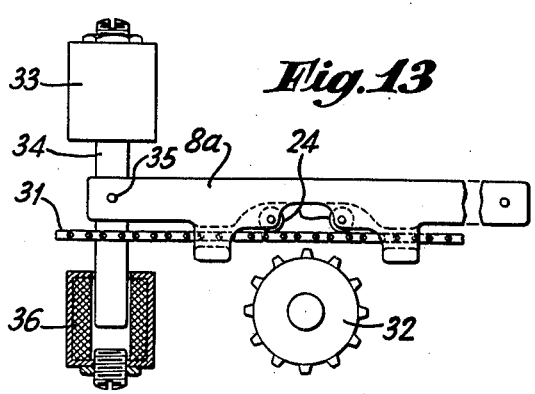
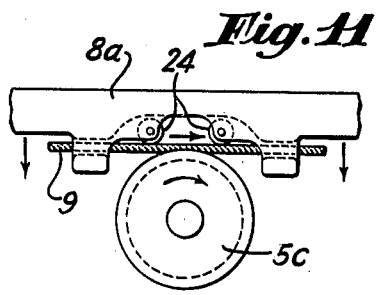
INVENTOR.
WILLIAM C. EDDY
BY
ATTORNEY.

Oct. 26, 1943.   W. C. EDDY   2,332,785
REMOTE CONTROL APPARATUS
Filed May 26, 1939   3 Sheets-Sheet 3

INVENTOR
WILLIAM C. EDDY
BY
ATTORNEY

Patented Oct. 26, 1943

2,332,785

UNITED STATES PATENT OFFICE 2,332,785

REMOTE CONTROL APPARATUS

William Crawford Eddy, Port Washington, N. Y., assignor to Radio Corporation of America, a corporation of Delaware Application May 26, 1939, Serial No. 275,791

15 Claims. (Cl. 74—223)

This invention relates to remote control apparatus and more particularly to a power transmitting unit for selectively operating different mechanisms from a single motor.

In order to meet the problem of remotely controlling a number of different elements of a device whose functions are to be performed selectively, it has been the practice heretofore to employ separate motors for the performance of each function. In place of the separate motors a more or less complex transmission drive gear was employed with separately controlled clutches.

In order to simplify the apparatus, and especially in order to perform different operations with the aid of a single motor, I have provided a compact control unit consisting of a rotational power source, a power gearing, a slotted roller and a plurality of clutch keys each actuated by a separate solenoid. The circuits for the individual solenoids may be controlled from any remote point. A shaft or suitable belt is arranged to be led through the clutch members in such a manner that whenever it is desired to apply motion thereto, the circuit to a given solenoid is closed and the solenoid causes the clutch key to produce peripheral contact between said shaft or belt and said slotted roller for sufficient time to perform any mechanical function which is under control of the shaft or belt.

It is an object of my invention to provide remote control apparatus of the type wherein a single power source may be applied selectively for the performance of different mechanical movements.

It is another object of my invention to provide a remotely controlled power transmitting unit which is capable of use in a variety of different ways, particularly where it is required to perform different mechanical operations in response to the closing of any one or more of a plurality of selective circuits.

It is a further object of my invention to provide means for operating different mechanisms reversibly in response to the closure of one or the other of two remote control circuits.

It is a further object of my invention to provide remote control apparatus wherein a movement of predetermined extent can be brought about in any selected mechanism in response to the closure of a remote control circuit.

Other objects and advantages of my invention will become apparent upon reading the ensuing part of this specification wherein reference is made to the accompanying drawings. The figures of the drawings are briefly described as follows:

Figure 1 shows in plan view one embodiment of the transmission unit according to my invention;

Fig. 2 is a view in elevation of the same apparatus otherwise shown in Fig. 1;

Fig. 3 is an end view of the same apparatus;

Fig. 4 is a perspective of one of the clutch keys otherwise shown in the assembly views of Figs. 1, 2 and 3;

Fig. 5 is an enlarged sectional view along the line 5—5 of Fig. 1;

Fig. 6 is a view similar to that of Fig. 5 but illustrating the flexure of the belt when peripheral contact is made with the slotted roller;

Fig. 7 is an enlarged cross-sectional view in detail with respect to a portion of the apparatus as shown in Fig. 1, the section being made along the line 7—7 of Fig. 1;

Fig. 8 is a detailed view of a modified embodiment of the slotted roller;

Fig. 9 is a detailed view of a somewhat differently designed slotted roller;

Fig. 10 shows an end view of the same roller otherwise shown in Fig. 9 but in assembly with one of the clutch keys;

Figure 11A:
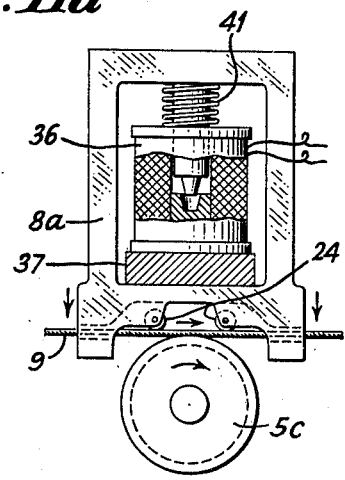
Fig. 11 illustrates diagrammatically the use of rollers mounted on the clutch key where the design of the apparatus is suited to the application of considerable power.
Figure 14:
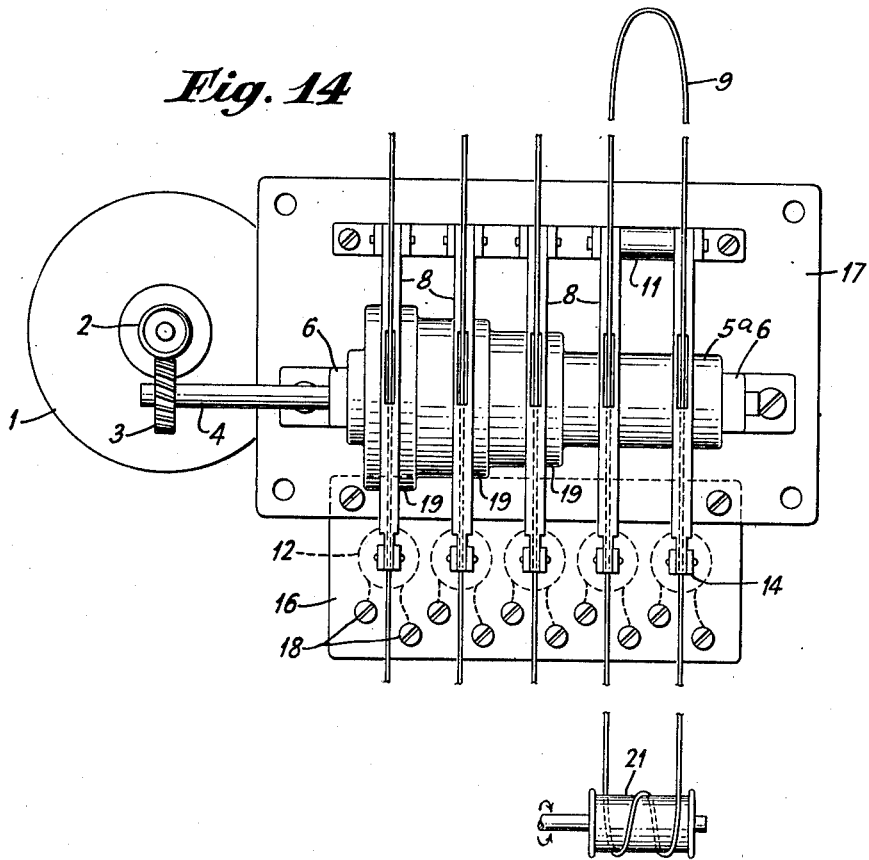

Fig. 11a supplements Fig. 11 for the purpose of illustrating solenoidal operation of a clutch member 8a;

Fig. 12 illustrates the principles involved in rendering the selective remote control apparatus reversible in its effect;

Fig. 13 shows a modification in which a combination of chain and sprocket wheel is used for transmitting power, and the meshing of the chain with the sprocket wheel is controlled by a double-acting solenoid device, and Fig. 14 shows in plan view a transmission unit 6 similar to the embodiment of Fig. 1 except that a somewhat different roller member is utilized. This figure also illustrates the assembly of elements otherwise detailed in Figs. 8 and 12.

Referring generally to Figs. 1, 2 and 3 wherein like parts are given corresponding reference numbers, I provide an apparatus unit including a motor 1, the shaft of which is preferably provided with a worm 2 engaging with a worm wheel 3, the latter being mounted upon a drive shaft 4 on which the slotted roller 5 is carried. The shaft 4 is journalled in bearings 6.

The slotted roller 5 may be of such length as to provide for any number of different belts which are to be selectively controlled for actuating different mechanisms. The nature of the work to be performed by the transmission unit determines whether the roller shall be of uniform diameter as shown in Fig. 1, or whether it should be formed with steps as shown by the roller 5a in Fig. 8.

Mounted on a pivot shaft 7 is a plurality of clutch keys 8 each of which is of suitable formation as shown in Fig. 4 for controlling the frictional engagement of a belt 9 with the side walls of the slots cut in the roller 5. The belt 9 is preferably threaded through two holes 10 in the clutch member 8. The two holes 10 are disposed on opposite sides of the point of tangency of the belt 9 with respect to the roller 5. Consequently, when the clutch member 8 is advanced toward the axis of the roller 5, the belt becomes doubly flexed. The clutch members 8 may be held suitably spaced apart by means of spacing sleeves 11 which are slipped over the pivot shaft 7.

In order to operate clutch keys 8 I preferably provide individual solenoids 12 each having an armature 13 which is provided at the upper part with a yoke 14 pivoted to the swinging end of the clutch key 8. The belt 9 which is carried by the clutch key 8 can be threaded through the opening 15 in the yoke.

The solenoids 12 are preferably mounted in a holder 16 which is secured to the base 17 of the transmission unit. Suitable terminals or binding screws 18 are provided for the solenoid windings so that remote control circuits may be connected thereto.

Figs. 5, 6 and 7 show clearly how the clutch keys 8 are made effective for engaging the belt 9 with the slotted roller 5. The slots are preferably provided with inclined or V-cut walls 19. They are also cut to a depth such that when the belt 9 is pressed therein its cross-sectional pattern tends to become egg-shaped so as to increase the frictional surface engagement thereof with the V-shaped walls 19.

There is a wide choice of materials and constructions which are suitable for the belt itself. I have found, however, that by making the belt in the form of a helix and by winding it from wire which is highly tempered, a number of advantages are gained. There is, of course, a certain amount of elasticity in the belt itself if wound in the form of a helix. Then, too, the convolutions of the helix are such as to provide a frictional engagement with the V-shaped notches in the roller 5. These notches may be smooth-cut where the driving power for operating a given mechanism is relatively small. On the other hand, if considerable power is to be applied, the slots in the roller may be knurled, or may even be cut as gear teeth and of a pitch corresponding to the number of convolutions per unit length of the helically wound belt 9.

The normal, or disengaged, position of the belt 9 with respect to the roller 5 is shown in Fig. 5. The key clutch member 8 may be held upwardly and away from the roller 5 either by virtue of its effective suspension by the belt 9, or, if desired, a leaf spring 20 (Fig. 3) may be provided having a portion which supports the clutch member 8 on the underside thereof. Other tensional means may be provided as an alternative to the spring 20.

When any one of the solenoids 12 is energized, its armature 13 is pulled downwardly, thus causing the clutch member 8 to guide the belt 9 into frictional engagement with the V-shaped walls 19 of the roller 5. The belt is bent sufficiently about the periphery of the roller 5 so as to be pulled in the direction of motion of said roller. This direction of motion is illustratively shown in Fig. 3 by means of arrows. Here a right-to-left direction of travel of the belt 9 is obtained because the roller 20 revolves counter-clockwise.

Fig. 12 shows how a rotatable member or spool 21 may be reversibly driven in response to the selective control of two different clutch members 8 arranged side-by-side along the periphery of the roller 5. The clutch members themselves are not shown in Fig. 12, since it will be understood from the other figures how they are applied. The belt 9 in this case is wound about the drum 21 and is made to engage with two different slots in the roller 5. The belt 9 is endless, a portion being looped where it extends from one slot to the other at the output side of the transmission unit. For operating the rotatable element 21, as shown in Fig. 12, in one direction, the portion of the belt 9 which extends across the right-hand slot of the roller 5 is engaged therewith by selective actuation of the right-hand clutch key (not shown). Correspondingly, for driving the rotatable mechanism 21 in the opposite direction, the left-hand clutch key (not shown) will be actuated by its solenoid. Since it is not intended to actuate both clutch keys simultaneously the size of the loop in the belt extending from one slot to the other remains constant.

Referring to Fig. 8, it will be seen that, by arranging stepped pulleys on the roller 5a, different speeds of drive can be applied to different belts for performing a number of different control functions which must be so correlated. Fig. 8 further illustrates the principle of increasing the frictional engagement of the belt in the slot by knurling the hollow part of the slot itself. The knurled surface is shown at 22. The two grooves 22 in the pulley 5a may if desired be employed for reversibly actuating a single belt which is in the form of a loop as shown in Fig. 12.

Referring to Figs. 9 and 10, I show a modification of the invention wherein the roller 5b is arranged with V-cut slots extending over a limited arc of the periphery, the remainder of the arc being cut out with a much wider slot with which the belt cannot bindingly engage. Upon rotatting the roller 5b through one complete revolution a limited extent of pull is given to the belt 9 and the belt is thereafter released. This arrangement provides for certain applications of the transmission unit wherein the solenoid circuit would be closed for a limited time somewhat less than the time required to rotate the roller 5b through 360°. The extent of movement given to the belt 9 is limited to the time during which the belt can be gripped in the narrow slot 23. This gripping action continues for a period of time which is commensurate with the time interval during which the roller 5b rotates through the angle A (Fig. 10). The arc A subtended by the narrow slot 23 can, therefore, be predetermined by experiment in order to produce a given limited drag of the belt 9 upon each revolution of the roller 5b.

Referring to Figs. 11 and 11a, I show therein an application of my invention in cases where considerable power is to be applied in exerting a pull upon the belt 9. In this case the clutch key member 8a may be suitably mounted for equal movement of both ends so as to maintain the input and output openings for the belt 9 in a horizontal plane. Details of a suitable mounting for this purpose are not shown, since they may be varied as a matter of mere mechanical skill so as to meet any individual requirements of design. In order to reduce the friction of the belt upon the input and output openings of the key member 8a when the latter is pulled downwardly, rollers 24 are provided, these being journalled in bearings which are integral with the key member 8a. The mechanism shown in Figs. 11 and 11a is well adapted to the application of considerable power for pulling the belt 9 in the direction of rotation of the roller 5c.

Referring to Fig. 13, I show therein another modification which is suitable for use where the transmitting unit is to be subjected to heavy duty. In this case the belt 9 of the other modifications is replaced by a link chain 31. This chain is adapted to mesh with a sprocket wheel 32 which is substituted for the slotted roller 5 of the other embodiments. Here again I preferably employ guide rollers 24 mounted in the clutch member 8a, the same as is shown in the embodiment of Figs. 11 and 11a. The clutch member 8a may be positively and reversibly actuated from one to the other of two positions, one for engaging the chain 31 with the sprocket wheel 32 and the other for providing disengagement. Two double-ended solenoid armatures 34 are connected by wrist pins 35 to the clutch member 8a, one at each end thereof. The structure at only one end is shown as it will be understood that it may be duplicated at the other end. The upper solenoids 33 may be used for suspending the armatures and the clutch member in the chain disengaging position, power being applied to the windings of the two upper solenoids either in series or in parallel. When the chain 31 is to be driven, then power is transferred from the upper solenoids 33 to two lower solenoids 36 (only one of which is shown), thus drawing down the clutch member 8a to a position where the chain 31 will mesh with the sprocket wheel 32.

In the arrangement of Fig. 13, as in the other arrangements, it will be understood that any number of sprocket wheels may be mounted on a single shaft and each will be adapted to engage with a different chain 31 for selectively driving a suitable utilization device. It will be apparent that I may, if desired, adopt the use of resilient means for holding the clutch member 8a in the disengaging position, in which case the upper solenoids 33 may be dispensed with. This arrangement is more clearly shown in Fig. 11a.

The assembly view given in Fig. 14 is quite similar to that of Fig. 1. A stepped pulley 5a is, however, substituted for the cylindrical pulley 5 of Fig. 1. The use of two clutch members 8 in conjunction with a single belt 9 is also illustrated, the same as shown in Fig. 12. This arrangement operating in conjunction with a driven pulley 21 provides for reversible rotation of the latter, depending upon which of two clutch members is selected. The driving of different belts, or tensional members for clutching the same into engagement with portions of the stepped pulley 5a which have different diameters, provides, of course, for different driving speeds of these belts in relation to each other. The correspondence of other parts between Figs. 14 and 1 is evidenced by the use of like reference numbers. Accordingly, no further description of this figure is deemed necessary.

It is contemplated that my invention will be found particularly useful in the control of complicated mechanisms wherein different movements are to be obtained for different portions of the mechanism at different times or simultaneously. As an example of one application of this invention, I may mention that in the control of studio lighting units it is very important that the various lighting units themselves shall be made remotely controllable in order to follow the actors with spot lights. Such illuminating devices have been disclosed in my Patents 2,221,079, issued November 12, 1940, and 2,280,901, issued April 28, 1942. Reference to the studio lighting system will make it clear how the various mechanical controls for orientation and tilting of the lights may be centered at a power driving system such as herein shown. All of the controls in that case would then be applied by selective actuation of different solenoids 12 of the present system and the conversion of this electric selective control into a mechanical control will be clearly understood by those skilled in the art.

Another application of my invention may be found in the requirements for orientation and tilting of a camera or a series of cameras, or television pick-up units. In such an application it may be desirable to place different pick-up units at different points about an area where a sporting event or other performance is to be photographed, or televised. In order to reduce the personnel for operating the different cameras it will be seen that a remote control unit such as herein disclosed would enable a single operator to orient, tilt and focus each camera from a remote point, that is, the point of observation of the operator himself.

Another use for this remote control unit is one which corresponds to the push-button tuning control of receivers or transmitters. Still another application of the invention is one in which a plurality of mobile units disposed in different locations may be required to operate in synchronism and to carry out corresponding functions. In this case parallel or series circuits through the solenoids of a plurality of different remote control units may all be operated simultaneously and conjointly from one set of push-buttons located within reach of a single operator.

Still another application of my invention may be for the purpose of orienting an antenna array or a series of antenna arrays to produce a given directional response.

I have also made use of my invention for actuating the different members of an automaton or marionette, such as may be used in animated figure performances for television broadcasting. In this case the different belts which are controlled correspond with the muscles in the arms and legs of the automaton. When the belts are pulled they provide for the remote control of the automaton to simulate the performance of a human actor. In this case the motor and transmission unit for actuating the automaton are preferably concealed within the body and it is only necessary to provide connections from the automaton through a multiple conductor cable to a point of remote control by an operator, so as to control all of the different muscular movements which may be required.

Other applications of my invention will readily occur to those skilled in the art. The invention itself is, therefore, limited in its scope only in accordance with the claims.

I claim:

1. In apparatus for remotely controlling a plurality of devices to be mechanically actuated, flexible tensional means for individually actuating said devices, a common power transmission drive unit rotatable in bearings, a single motor for constantly rotating said drive unit, and electromagnetically operable means having passageways therein through which said tensional means are individually guided, said electromagnetically operable means being arranged for flexing said tensional means thereby to selectively engage the same with said drive unit, and around a substantial arc thereof, so that a pull is caused to be exerted on said tensional means.

2. Apparatus in accordance with claim 1 in which said tensional means is constituted by a plurality of belts, each belt being a helically wound wire.

3. Apparatus in accordance with claim 1 in which said tensional means is constituted by a plurality of sprocket chains.

4. Apparatus in accordance with claim 1 in which a chosen unit of said tensional means is constituted as an endless belt having two units of said electromagnetically operable means associated therewith for exerting a pull on said belt in either direction.

5. A transmission drive mechanism comprising a base, a roller journaled in said base, a worm wheel flexed to the shaft of said roller, a motor having a worm on its armature shaft for meshing with said worm wheel and for driving said roller, a plurality of flexible tensional members to be selectively drawn by said roller, and electromagnetically actuated members having idler rollers mounted thereon for guiding said tensional members individually into and out of driven engagement with the first said roller.

6. A selective driving transmission for application of power to a plurality of utilization devices, comprising a single motor, a pulley constantly driven by said motor, said pulley being provided with a plurality of belt channels, a flexible belt frictionally engageable with the inclined walls of each said channel, clutch keys each for guiding one of said belts respectively, each said key being provided with eyes through which the belt is threaded, means including a concave bearing surface on each said key for pressing the belt into driven engagement with said pulley, and a solenoid having an armature connected to said key for actuating the same.

7. A device in accordance with claim 6 in which said pulley is of step-formation.

8. A device in accordance with claim 6 in which the channels of said pulley are knurled.

9. A device in accordance with claim 6 and provided with means including a spring for normally retaining said key and its associated belt in a position of disengagement from said pulley, said solenoid being operable in opposition to the force of said spring.

10. A selective driving transmission for application of power to a plurality of utilization devices, comprising a single motor, a shaft geared to said motor and constantly driven thereby, a plurality of sprocket wheels fixed to said shaft, a chain adapted to mesh with each said sprocket wheel, a chain guide individual to each chain, each said guide comprising a bar having guide holes therein and bearings, rollers swivelled in said bearings and adapted to apply pressure against an appropriate one of said chains, and means electromagnetically controlled for actuating each said chain guide selectively thereby to guide its appropriate chain into and out of mesh with its sprocket wheel.

11. Selective transmission means comprising a common driving shaft, a drum member fixed to said shaft and having a plurality of peripheral grooves therein, a belt disposed in alignment with each groove, and magnetically actuated clutch members, each individual to an appropriate one of said belts, respectively, each said groove being of restricted width in predetermined arcs of the drum periphery thereby to frictionally engage its belt for a portion only of one drum revolution while the associated clutch member is actuated, each said groove being of greater width throughout the remainder of the drum periphery, thereby to release the belt while said greater width of groove is presented to the actuated clutch member.

12. A remote control system for selectively and mechanically actuating a plurality of devices, comprising in combination, a plurality of flexible linear members each capable of transmitting power by traction to an appropriate one of said devices, a single motor, a rotatable member constantly driven by said motor, said member having peripheral surfaces arranged and adapted to engage with and drive said linear members, a plurality of foraminous clutch members, each being arranged for an individual one of said linear members to be conducted through at least one foramen therein, each of said clutch members constituting means for guiding its linear member into and out of driven engagement with said rotatable member, and electromagnetic means for selectively actuating each of said clutch members.

13. A system according to claim 12 in which said flexible linear members are constituted as sprocket chains.

14. A system according to claim 12 in which said clutch members are provided with rollers for exerting pressure on said linear members.

15. A remote control system for selectively and mechanically actuating a plurality of devices, comprising in combination, a plurality of flexible belts each capable of transmitting power by traction to an appropriate one of said devices, a single motor, a pulley constantly driven by said motor, said pulley having belt grooves adapted to receive said belts and drive the same by frictional engagement therewith, a plurality of clutch members each having at least one orifice therein through which an individual one of said belts is conducted, each said clutch member constituting means for guiding said belt into and out of driven engagement with said pulley, and electromagnetic means for selectively actuating each of said clutch members.

WILLIAM CRAWFORD EDDY.